United States Patent [19]
Speidel

[11] Patent Number: 4,884,362
[45] Date of Patent: Dec. 5, 1989

[54] METHOD AND APPARATUS FOR APPLYING LIQUID CHEMICALS TO PLANTS

[76] Inventor: Steven W. Speidel, Rte. #8, Lincoln, Nebr. 68506

[21] Appl. No.: 253,410

[22] Filed: Oct. 4, 1988

Related U.S. Application Data

[63] Continuation of Ser. No. 775,102, Sep. 11, 1985, abandoned, which is a continuation of Ser. No. 493,437, May 11, 1983, abandoned, which is a continuation of Ser. No. 222,935, Jan. 6, 1981, abandoned.

[51] Int. Cl.$^4$ .............................................. A01G 13/00
[52] U.S. Cl. ..................................... 47/1.5; 47/1.7; 137/38
[58] Field of Search ..................................... 47/1.5, 1.7

[56] References Cited

U.S. PATENT DOCUMENTS

| | | | |
|---|---|---|---|
| 2,158,114 | 5/1939 | Fullilove | 47/1.5 |
| 2,158,115 | 5/1939 | Fullilove | 47/1.5 |
| 2,311,782 | 2/1943 | Segars | 47/1.5 |
| 2,659,918 | 11/1953 | Stoner | 47/1.5 |
| 3,184,888 | 5/1965 | Fruth et al. | 47/1.5 |
| 3,651,600 | 3/1972 | Ewenof | 47/1.5 |
| 3,972,340 | 8/1976 | Miller et al. | 137/38 |
| 4,027,986 | 6/1977 | Patrick | 47/1.5 |
| 4,068,635 | 1/1978 | Yuneck | 137/38 |
| 4,187,638 | 2/1980 | Hardy et al. | 47/1.5 |
| 4,291,441 | 9/1981 | Maddock | 47/1.5 |
| 4,305,224 | 12/1981 | Maddock | 47/1.5 |
| 4,332,107 | 6/1982 | Reed | 47/1.5 |
| 4,357,779 | 11/1982 | Maddock | 47/1.5 |
| 4,409,755 | 10/1983 | Maddock | 47/1.5 |
| 4,471,368 | 9/1984 | Keeton | 47/1.5 |

*Primary Examiner*—Robert A. Hafer
*Assistant Examiner*—Lynda M. Cofsky
*Attorney, Agent, or Firm*—William R. Hinds

[57] ABSTRACT

An apparatus for applying a liquid chemical to plants includes an elongate hollow body which contains a liquid chemical. In use, the hollow body is transported through the plants in a direction transverse to the length of the elongate body. The elongate body includes a row of bottom holes and a row of side holes positioned along the leading side of the elongate body. A canvas cover is tightly wrapped around the elongate body in a double layer and the peripheral side edges of the canvas are sealed. The elongate body is filled with the chemical and an air valve is adjusted to bleed air into the interior of the elongate body. The elongate body is then moved through the field and, by adjusting the position of the elongate body above the ground, the chemical which has seeped into the canvas is wiped onto the plants. In a preferred embodiment, the elongate body is circular and made of a plastic material. Also, the side holes are larger than the bottom holes, and for hilly terrain, the side holes near each end are smaller than the side holes in the middle. A gate valve can also be provided near the middle of the elongate body to prevent the chemical from rushing to one end on hilly terrain.

14 Claims, 1 Drawing Sheet

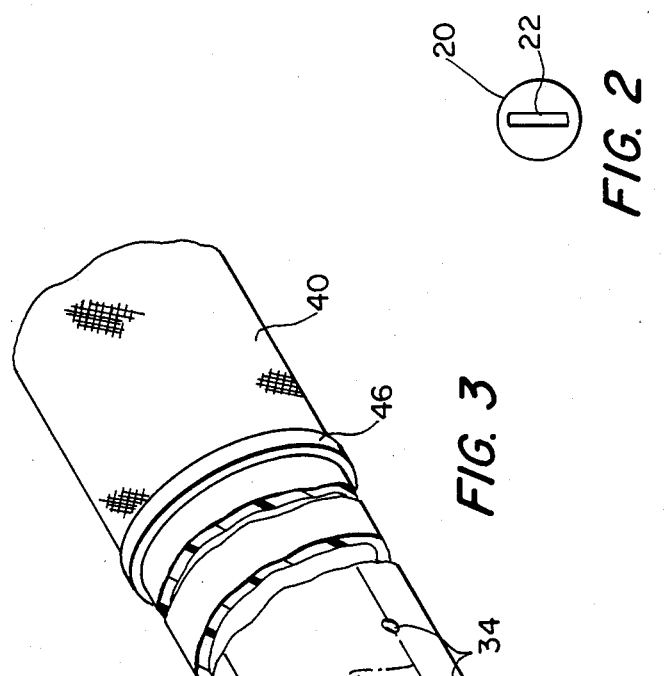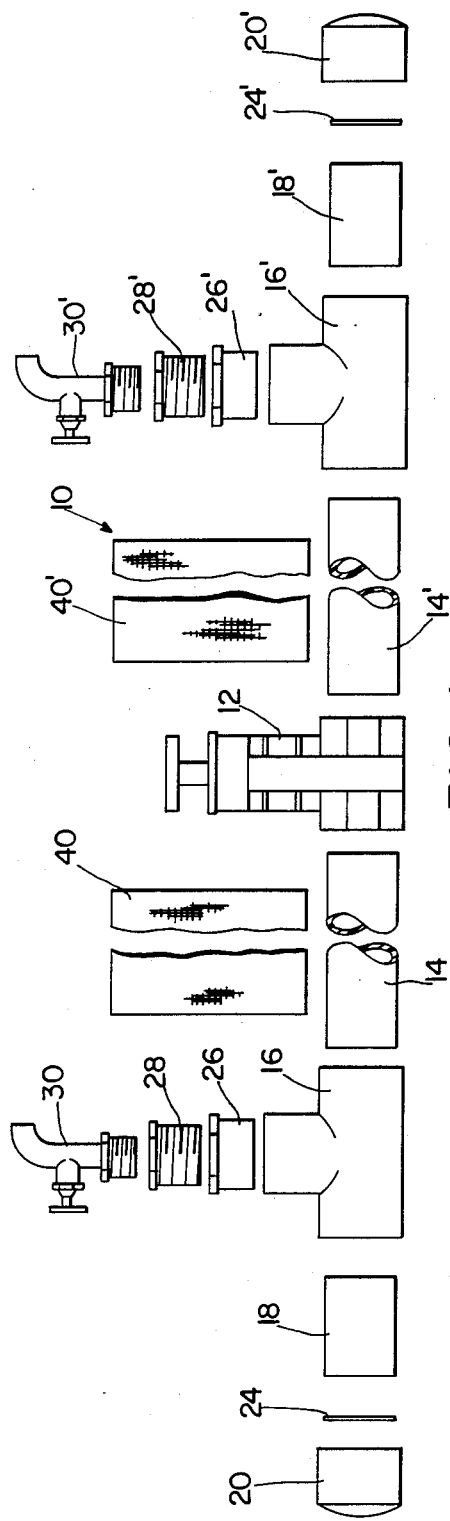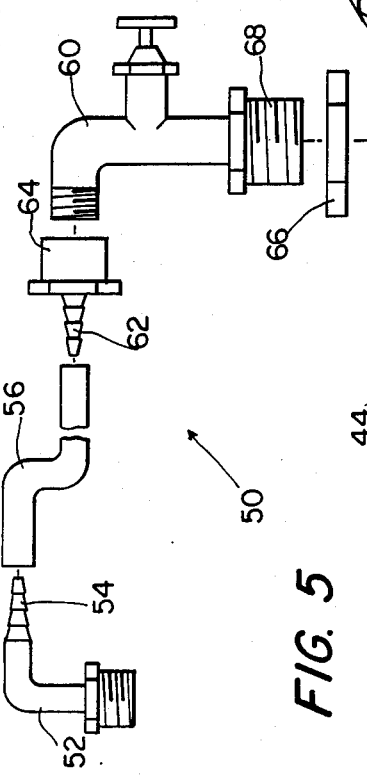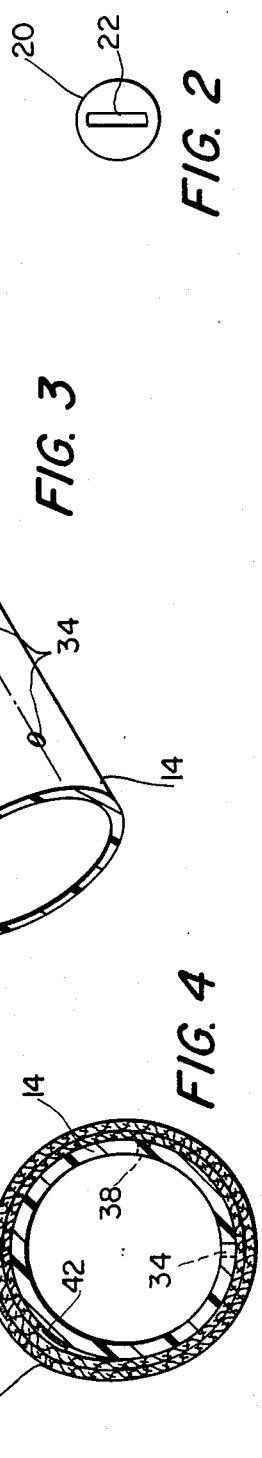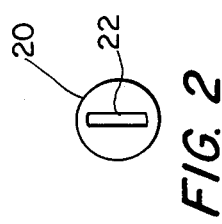

METHOD AND APPARATUS FOR APPLYING LIQUID CHEMICALS TO PLANTS

This is a continuation of application Ser. No. 775,102 filed Sept. 11, 1985, which is a continuation of Ser. No. 493,437, filed May 11, 1983, now abandoned, which is a continuation of Ser. No. 222,935, filed Jan. 6, 1981, now abandoned.

FIELD OF THE INVENTION

This invention relates generally to a method and apparatus for applying herbicides and other chemical to weeds or plants growing in a field, and more particularly to a method and apparatus in which the chemical is wiped onto the weeds or plants from an elongate body passing through the weeds or plants.

BACKGROUND OF THE INVENTION

A number of prior art devices have been disclosed in the prior art for applying a herbicide to weeds in a field which have grown taller than the crop. One applicator which has been introduced recently and has become very popular is a "rope wick" applicator. A rope-wick applicator is disclosed in U.S. Pat. No. 4,187,638 to Hardy et al. This type of applicator uses an elongate hollow body through which portions of nylon rope extend and act as wicks. While the rope wick applicator has been used successfully, there are a number of problems associated with its use. As disclosed in an article entitled "Make No Mistake: Rope-Wick Applicators Take Management" appearing in the May, 1980 issue of *Progressive Farmer* at page 34, there are a number of problems which occur with this type of applicator. Chief among these problems is the dripping from the rope or the failure of the herbicide to wick in the ropes. In addition, the ropes have been pulled loose during use and there is only a limited wiping surface. Another applicator which uses ropes is manufactured by BoBar Company located at 101 South Main, Hale Center, Tex. This applicator consists of a number of ropes which are hung parallel to the direction of travel between two manifolds. An additional disadvantage of this device is that the manifolds bend the tall weeds away from the ropes so that the ropes may not contact these weeds.

Another type of commercial device disclosed in the prior art is a roller applicator. One such device is manufactured by Irrigation Specialties, Inc., Scottsbluff, Nebr. 69361. This device has an elongate body around which a carpet is rolled. As the device is transported through the field, the carpet roll is rotated and the chemical is first sprayed onto the outside of the roll from where the chemical is then wiped onto the tall weeds. Another commercial device is a recirculating sprayer such as manufactured by Sprayrite Manufacturing Company of West Helena, Arkansas. With this device, a plurality of spray heads direct the herbicide onto the plants. The spray which does not contact the plants is collected on a collection board and pumped back to the sprayer nozzles. This relatively expensive device suffered from a number of problems due to its complexity. Another type of recirculating sprayer was once manufactured by the Kuker Company of Omaha, Nebraska. This device included spray nozzles which saturated a canvas exterior of the boom which contacted the weeds. Herbicide which was not wiped from the canvas was recirculated to the spray nozzles.

There have also been disclosed in the prior art devices which have a perforated pipe covered with cloth which wipe across the weeds. Such devices are disclosed in U.S. Pat. Nos. 3,320,694 to Biron and 4,019,278 to McKirdy.

Besides use in a field, weed killing liquid applicators have also been disclosed for lawn use. For example, in U.S. Pat. No. 3,198,396 to Bailey, a trough mounted for movement over the grass includes a cloth portion which contacts the weeds. Similar to the device disclosed in Bailey and the roller applications disclosed above, is a device disclosed in U.S. Pat. No. 3,651,600 to Ewing. The device disclosed in this patent includes a tube mounted for rotation about the grass having a carpet cover. As the tube and carpet rotate, herbicide is absorbed by the cover through holes in the tube. An applicator which contacts the ground and has baffles to prevent the liquid from flowing to one side is disclosed in U.S. Pat. No. 2,551,096 to Chittick. The use of an air valve to control the flow rate of liquid through a porous weed applicator member has also been disclosed in U.S. Pat. No. 3,184,888 to Fruth et al.

While the prior art does contain a number of weed applicators, including applicators which have been commercially successful, a number of disadvantages are associated with these devices. For example, applicators which have been disclosed for use in a field are unduly complicated and expensive. In addition, the disclosed applicators may drip herbicide onto crops inadvertently. Another problem with prior art applicators is that often difficult maintenance is required. With regard to the applicators using spray nozzles, the use of these applicators during windy conditions is prohibited.

SUMMARY OF THE INVENTION

In accordance with the present invention, a method and apparatus are provided for applying liquid chemicals to plants such as weeds. The apparatus includes an elongate hollow body having end closures, which contains the liquid chemical. The elongate body has a row of bottom holes and another row of side holes located above the bottom holes on the leading side. Wrapped tightly around the elongate body is a cover of canvas. The liquid chemical contained inside of the hollow body seeps into the canvas cover and is wiped onto the weeds. In order to control the seepage of the liquid chemical, an adjustable air valve is provided in the elongate body. In addition, a view port is also provided in the elongate body to determine the level of chemical in the elongate body.

According to a preferred embodiment, the canvas cover is wrapped twice around the elongate body in the direction which the plants wipe across the body. The canvas cover is attached to the upper quadrant of the trailing side of the elongate body and the other end is then attached near the top of the trailing side to the layer of canvas below. The peripheral side edges of the canvas are also attached to the elongate body. In addition, the side holes are larger than the bottom holes although the side holes near each end are smaller than the remainder of the side holes. A gate valve may also be provided midway between the two ends of the elongate body to prevent the liquid chemical from rushing to one end when the elongate body is used on an incline. With this embodiment, an inexpensive, easily maintained, durable, reliable, efficient, and uncomplicated liquid chemical applying device is provided.

Other features and advantages of the present invention are stated in or apparent from the detailed description of a presently preferred embodiment of the invention found hereinbelow.

BRIEF DESCRIPTION OF THE DRAWINGS

FIG. 1 is an exploded front view of the liquid chemical applicator of the present invention.

FIG. 2 is an end view of the end cap depicted in FIG. 1.

FIG. 3 is a cutaway perspective view of the elongate body of the present invention.

FIG. 4 is a cross-sectional view of the elongate body taken along the like 4—4 in FIG. 3.

FIG. 5 is a schematic front view of an alternative embodiment of the air valve.

DETAILED DESCRIPTION OF THE PREFERRED EMBODIMENT

With reference now to the drawings in which like numerals represent like elements throughout the several views, a presently preferred embodiment of the present invention is depicted in FIG. 1 and comprises a liquid applicator 10 which is made up entirely of commercially available PVC parts. By use of commercially available PVC parts, the present invention can be made inexpensively and easily. Located in the center of liquid applicator 10 is a gate valve 12. As the components of liquid applicator 10 are identical on either side of gate valve 12, only the components on one side of gate valve 12 will be described in detail. Glued in the flanged fitting of gate valve 12 is an elongate hollow tube 14. A suitable PVC plastic pipe for elongate hollow tube 14 is a Schedule 40 PVC pipe having a 1½ inch or 2 inch diameter. Glued on the opposite end of elongate hollow tube 14 is a T section 16. Glued on the other end of T section 16 is a short section of connecting pipe 18. An end cap 20 is glued on the other end of connecting pipe 18. As shown in FIG. 2, end cap 20 includes a vertical slot 22. Located between end cap 20 and connecting pipe 18 is a translucent disc 24.

The center opening of T section 16 has a reducing bushing 26 glued therein. Reducing bushing 26 has an interior threaded portion which receives a threaded reducing bushing 28. Threaded reducing bushing 28 also has an interior threaded portion which receives faucet 30.

Depicted in FIG. 3 is a portion of elongate hollow tube 14. The bottom portion of elongate hollow tube 14 is indicated by bottom line 32. Located at equal distances along bottom line 32 are a plurality of bottom holes 34. Located 90° from bottom line 32 about the periphery of elongate hollow tube 14 is a leading side line 36 representing the leading side edge of elongate hollow tube 14. Located 0° to 20° below leading side line 36 is a row of side holes 38. The exact location of side holes 38 depends upon the diameter of the pipe being used due to the larger liquid pressure found in larger pipes. For a 1½ inch diameter pipe, side holes 38 are approximately 15° below side line 36, and for a 2 inch diameter pipe, side holes 38 are approximately 6° below side line 36. Side holes 38 are also equally spaced from each other and each side hole 38 is located above but midway between adjacent bottom holes 34.

A suitable size for bottom holes 34 is a ⅛ inch diameter where bottom holes 34 are spaced every two inches. Side holes 38 are preferably almost twice as large as bottom holes 34. Where liquid applicator 10 is to be used on hilly terrain, it is suggested that side holes 38 near each T section 16 and 16' be smaller than the side holes along the rest of the length of elongate hollow tubes 14 and 14'. For example, side hole 38 nearest T section 16 can be 5/32 inch diameter, the next five side holes 38 can be 3/16 inch diameter, and the rest of side holes 38 can be 7/32 inch diameter with the exception of the center hole and the third hole on each side of the center hole which can be ¼ inch diameter. In the same manner, side holes 38 nearest gate valve 12 are also smaller than side holes 38 in the middle of elongate tube 14.

Wrapped tightly around elongate hollow tube 14 is a single piece of canvas 40. A suitable canvas is a 10 ounce, double fill, unbleached cotton canvas. As shown in FIG. 4, one longitudinal edge of canvas 40 is secured by a glue layer 42 along the longitudinal length of elongate hollow tube 14. Glue layer 42 is located near the middle of the upper quadrant of the trailing side of elongate tube 14. Canvas 40 is then wrapped clockwise as shown in FIG. 4 twice around hollow tube 14. The other longitudinal end of canvas 40 is then attached to the underlying layer of canvas 40 by a glue layer 44. As shown, glue layer 44 is located just below the top of the upper quadrant of the trailing side of elongate hollow tube 14. Canvas 40 is located on elongate hollow tube 14 so as to completely cover elongate hollow tube 14 between the flanges of gate valve 12 and T section 16. Adjacent the flanges of gate valve 12 and T section 16, the peripheral side edges of canvas 40 are glued to elongate hollow tube 14 and to the underlying canvas. A suitable glue to secure canvas 40 to elongate hollow tube 14 is a clear PVC plastic pipe cement with a medium fast set. To glue canvas 40 to itself, a fabric cement is suitable. In order to assure that canvas 40 does not come unglued, ties 46 may also be applied around the outside of canvas 40. A suitable tie 46 is a white plastic or nylon self-locking tie. These ties have narrow plastic strips that are notched along their length with a slotted head on one end with an internal tab. The end is inserted into the head and then the tab catches in the slots so that when the strip is pulled tight it will not loosen.

After liquid applicator 10 is assembled, it is preferably mounted to a tractor. The total length of liquid applicator 10 is chosen to provide coverage over the entire width of a number of crop rows. Depending on the width and number of rows to be covered, the length of elongate hollow tube 14 is chosen to cover the corresponding distance. For example, the combined length of elongate hollow tubes 14 and 14' can be thirteen feet to cover four 36 inch rows. Similarly, the overall length of elongate hollow tubes 14 and 14' can be 16 feet to cover six 30 inch rows or 21 feet to cover eight 30 inch rows. The overall length of liquid applicator 10 is, of course, greater due to the T fittings 16 and 16' and end caps 20 and 20' which are fitted onto elongate hollow tubes 14 and 14'. Conveniently, liquid applicator 10 is attached to the front end loader of a tractor or any other carrying device which provides up and down movement. In this manner, the height of liquid applicator 10 above the crops can be varied easily. As liquid applicator 10 is made from PVC plastic, it must be supported along its length. In order to support liquid applicator 10, a one inch steel well pipe, angle iron, board, or other sufficiently strong support of substantially the same length as liquid applicator 10 is rigidly attached to the tractor loader. Liquid applicator 10 is then easily attached to the support by rubber straps, twine, clamps or the like.

Liquid applicator 10 must be attached to the support so that bottom line 32 is at the bottom and leading side line 36 is at the leading edge.

In order to fill liquid applicator 10 with the liquid chemical, threaded reducing bushing 28, to which faucet 30 is attached, is removed from reducing bushing 26. Assuming liquid applicator 10 is to be used on a hilly terrain, gate valve 12 is closed and the herbicide or other liquid chemical is then poured into T fitting 16 and elongate hollow tube 14. Elongate hollow tube 14 acts as a reservoir and the level of the liquid chemical in elongate hollow tube 14 is viewable through end cap 20 and translucent disc 24. After the liquid chemical is poured into elongate hollow tube 14, fitted bushing 28 and faucet 30 are screwed back into reducing bushing 26. In order to prevent liquid applicator 10 from dripping, faucet 30 is closed so that no air is admitted to elongate hollow tube 14. In the same manner, an equal amount of liquid chemical is poured into elongate hollow tube 14' and elongate hollow tube 14' is similarly reassembled and made airtight. Of course, if liquid applicator 10 is to be used on level ground, gate valve 12 can be left open and both elongate hollow tubes 14 and 14' are in fluid communication and can be filled from either T fitting 16 or 16'. As liquid applicator 10 will not drip any chemical, it is easily transported to the field where it will be used.

In operation, liquid applicator 10 functions in the following manner. Depending upon the amount of weed infestation, faucets 30 and 30' are opened to bleed enough air into elongate hollow tube 14 to maintain canvas 40 saturated with the liquid chemical or herbicide as the weeds are wiped by canvas 40. As the degree of weed infestation may vary in different parts of a field, it is suggested that faucets 30 and 30' be set for an average weed infestation, and the speed with which liquid applicator 10 is transported through the weeds be varied so as to be slower through thicker weeds and faster through sparser weed infestations. Of course, the height of liquid applicator 10 is also varied if the height of the weeds or crop varies significantly.

As liquid applicator 10 is transported through the weeds, it is important that leading side line 36 be the leading edge of elongate hollow tube 14 and that bottom line 32 be on the bottom. One reason for this positioning is that the most contact of canvas 40 with the weeds occurs along the lower quadrant of the leading side of elongate hollow tube 14. Thus, both the bottom holes 34 and side holes 38 act to wet the lower quadrant of the leading side of canvas 40. In addition, bottom holes 34 act to wet the lower quadrant of the trailing side of canvas 40 and side holes 38 act to wet the upper quadrant of the leading side of canvas 40. In this position, the upper quadrant of the trailing side of canvas 40 does not contact the weeds very much. It was for this reason that canvas 40 was glued along the upper quadrant of the trailing side because very little liquid chemical is absorbed in this area of the canvas 40 to be wiped onto the weeds. It should also be realized that canvas 40 has been wrapped around elongate tube 14 in the same direction that the weeds wipe across elongate tube 14. In this manner, canvas 40 remains tightly wrapped around elongate tube 14. In addition, by placing the glued seam of canvas 40 along the upper quadrant of the trailing side of elongate tube 14, the seam is least likely to catch on the weeds and to be pulled apart.

As the weeds wipe across canvas 40, the liquid chemical or herbicide is wiped onto the leaves and stems of the plants from saturated canvas 40. Additional liquid chemical seeps into canvas 40 at a controllable rate which is dependent upon the opening of faucets 30 and 30'. By wrapping canvas 40 tightly around elongate tube 14, canvas 40 does not become oversaturated so as to drip. In addition, the peripheral side edges of canvas 40 are also glued to elongate tube 14 to prevent any liquid chemical from passing out the sides of canvas 40 and dripping. It should be appreciated that the choice of canvas 40 to be the covering of elongate tube 14 was determined by a number of factors. Besides the ability to absorb the liquid chemical, canvas 40 also wear well in this application. In addition, because canvas 40 is smooth, weeds do not strike the canvas and get caught in the canvas or tear the canvas and dirt does not adhere to the canvas and clog the canvas.

Where elongate tube 14 has a 2 inch diameter, it can be half filled and used in moderate weed infestations for more than half a day. After application of the liquid chemical to the plants has been completed, faucets 30 and 30' are closed and the tractor is then parked on a slight incline so that liquid applicator 10 is inclined as well. Then, liquid applicator 10 is rotated so that faucet 30 or 30' is lowermost and both faucets are opened. With gate valve 12 opened, any liquid chemical left in elongate hollow tubes 14 or 14' is easily drained from faucet 30 or 30' into a suitable container. It is then a simple matter to flush water through elongate hollow tubes 14 and 14' and to hose off canvas 40 and 40'. No further maintenance should be required.

Depicted in FIG. 5 is an alternative embodiment of the present invention in which faucet 30 is replaced by an air valve assembly 50 having a faucet 60 which is remotely located from T fitting 16. Air valve assembly 50 includes an L-shaped fitting 52 which is threadably received in threaded bushing 28 in place of faucet 30. L-shaped fitting 52 includes a ½ inch hose fitting 54 to which a suitably sized flexible hose 56 is attached. The other end of hose 56 is attached to a ½ inch hose fitting 62 of a female threaded hose coupling 64. Female hose coupling 64 is received on the male hose coupling of faucet 60. A retaining nut 66 is received on the threaded portion 68 of faucet 60.

The purpose of air valve assembly 50 is to alloy faucet 60 to be mounted near the driver's seat on the tractor. In this manner, the driver can easily adjust the amount of air bleeding into elongate hollow tube 14 and hence control the rate of seepage of the liquid chemical into canvas 40 from his seat as the tractor and liquid applicator 10 are in operation. In order to mount faucet 60 near the driver's seat, a suitably sized hole is provided in a bracket which is mounted near the seat. Threaded portion 68 of faucet 60 is inserted into the hole and retaining nut 66 is tightened to hold faucet 60 securely to the bracket. A second complete air valve assembly is also provided to replace faucet 30'.

It should be noted that the preferred embodiment of the invention includes a gate valve 12 which is closed when liquid applicator 10 is used on a hilly terrain. However, if liquid applicator 10 is only to be used on level terrain, gate valve 12 could be omitted. In addition, liquid applicator 10 can be made in shorter lengths, and a plurality of liquid applicators 10 could be aligned to effect the width of coverage desired. By providing a number of liquid applicators 10, the transportation and storage of liquid applicators 10 is simplified.

Thus, while the invention has been described in detail with respect to an exemplary embodiment thereof, it will be understood by those of ordinary skill in the art that these and other variations and modifications may be effected in the exemplary embodiment within the scope and spirit of the invention.

I claim:

1. An applicator for applying a liquid chemical to plants comprising:
    an elongate hollow body, having end closures, which body contains a liquid chemical; said elongate body being transportable nonrotatably through the plants parallel to the ground and in a direction transverse to the length of said elongate body so that said elongate body has a bottom, a top, a leading side, and a trailing side;
    a fill opening in said elongate body through which the chemical is admitted to the interior of said elongate body;
    a row of bottom holes generally equally spaced from each other along the bottom of said elongate hollow body;
    a row of side holes located on the leading side of said elongate body at a position higher than said row of bottom holes; said side holes being spaced from each other, generally midway between adjacent bottom holes, and larger than said bottom holes;
    a canvas cover tightly wrapped around said elongate body so as to lie directly against the surface thereof and over and against said holes and form the outer wiping surface of the applicator; and
    an adjustable air valve in fluid communication with said elongate body through which air is admitted to the interior of said elongate body to control the seeping of the chemical from the interior of said elongate body through said bottom and side holes and into said canvas cover;
    such that as the applicator is passed through the plants, the chemical which seeps into said canvas cover is wiped onto the plants.

2. An applicator as claimed in claim 1 wherein said elongate hollow body is circular in transverse cross section.

3. An applicator as claimed in claim 1 wherein said canvas cover is formed of a single piece of canvas which is wrapped twice around said elongate body so as to provide said canvas cover with two overlapping layers of canvas.

4. An applicator as claimed in claim 3 wherein one longitudinal edge of said canvas cover is glued to the upper quadrant of the trailing side of said elongate body along the longitudinal length thereof.

5. An applicator as claimed in claim 4 wherein said canvas cover is wrapped in the direction which the plants rub along said cover; the other longitudinal edge of said canvas cover is glued to said canvas cover near the top of the upper quadrant of the trailing side of said elongate body; and the peripheral side edges of said canvas cover are glued to said elongate body.

6. An applicator as claimed in claim 5 further including a plurality of ties spaced along said elongate body and fastened around said canvas cover to help keep said canvas cover tightly wrapped about said elongate body.

7. An applicator as claimed in claim 1 wherein said side holes near each said closed end are smaller than the remainder of said side holes along the length of said elongate body.

8. An applicator as claimed in claim 7 further including a valve located in said elongate body substantially midway between said closed ends; and wherein said side holes near said valve are also smaller than the remainder of said side holes along the length of said elongate body.

9. An applicator as claimed in claim 1 wherein said adjustable air valve is a faucet located adjacent said elongate body such that by inverting said elongate body, said faucet provides an outlet to drain the chemical from said elongate body.

10. An applicator as claimed in claim 1 wherein said adjustable air valve is located remotely from said elongate hollow body.

11. An applicator as claimed in claim 1 wherein said elongate body and end closures are made of a plastic material.

12. An applicator as claimed in claim 1 wherein at least one of said end closures includes a view port means permitting viewing of the liquid chemical level in said elongate hollow body.

13. A method of applying a liquid chemical to weeds in a field which are taller than the crop with an elongate hollow body having closed ends and which body contains a liquid chemical;
    said elongate body being transportable nonrotatably through the plants parallel to the ground and in a direction transverse to the length of said elongate body so that said elongate body has a bottom, a top, a leading side, and a trailing side;
    a fill opening in said elongate body through which the chemical is admitted to the interior of said elongate body;
    a row of bottom holes generally equally spaced from each other along the bottom of said elongate hollow body;
    a row of side holes located on the leading side of said elongate body at a position higher than said row of bottom holes; said side holes being spaced from each other, generally midway between adjacent bottom holes;
    a canvas cover tightly wrapped around side elongate body so as to lie directly against the surface thereof and over and against said holes and form the outer wiping surface of the applicator; and
    an adjustable air valve in fluid communication with said elongate body through which air is admitted to the interior of said elongate body to control the seeping of the chemical from the interior of said elongate body through said bottom and side holes and into said canvas cover;
    filling the elongate body with the chemical;
    bleeding air into the interior of the elongate body;
    moving the elongate body through the field in a direction transverse to the length of the elongate body; and
    adjusting the height of the elongate body above the ground such that the weeds are contacted by the canvas and the chemical is wiped onto the weeds.

14. A method of applying a liquid chemical as claimed in claim 13 further including the steps of:
    closing a gate valve located in the elongate body to prevent the liquid chemical from rushing to one end of the elongate body when the elongate body is inclined.

* * * * *